(12) United States Patent
Yoo et al.

(10) Patent No.: US 8,583,855 B2
(45) Date of Patent: Nov. 12, 2013

(54) FLASH MEMORY PREPROCESSING SYSTEM AND METHOD

(75) Inventors: Han-woong Yoo, Seoul (KR); Jaehong Kim, Seoul (KR); Jun-jin Kong, Yongin-si (KR)

(73) Assignee: Samsung Electronics Co., Ltd., Suwon-si, Gyeonddi-do (KR)

( * ) Notice: Subject to any disclaimer, the term of this patent is extended or adjusted under 35 U.S.C. 154(b) by 619 days.

(21) Appl. No.: 12/780,979

(22) Filed: May 17, 2010

(65) Prior Publication Data

US 2010/0332737 A1 Dec. 30, 2010

(30) Foreign Application Priority Data

Jun. 24, 2009 (KR) ......................... 10-2009-0056539

(51) Int. Cl.
*G06F 12/00* (2006.01)

(52) U.S. Cl.
USPC .................................. 711/103; 711/E12.008

(58) Field of Classification Search
USPC ......................................................... 711/103
See application file for complete search history.

(56) References Cited

U.S. PATENT DOCUMENTS

| | | | | |
|---|---|---|---|---|
| 5,933,847 A | * | 8/1999 | Ogawa | 711/103 |
| 2006/0262628 A1 | * | 11/2006 | Nii et al. | 365/226 |
| 2008/0148115 A1 | * | 6/2008 | Sokolov et al. | 714/719 |
| 2008/0304323 A1 | * | 12/2008 | Cho et al. | 365/185.18 |
| 2009/0044032 A1 | * | 2/2009 | Chainer | 713/320 |
| 2009/0067266 A1 | * | 3/2009 | Roohparvar et al. | 365/189.16 |

FOREIGN PATENT DOCUMENTS

| | | | |
|---|---|---|---|
| JP | 2000067588 A | | 3/2000 |
| JP | 2004005179 A | * | 1/2004 |
| JP | 2008204528 A | | 9/2008 |
| WO | WO 2008068747 A2 | * | 6/2008 |

* cited by examiner

*Primary Examiner* — Reginald Bragdon
*Assistant Examiner* — Aracelis Ruiz
(74) *Attorney, Agent, or Firm* — Volentine & Whitt, PLLC

(57) ABSTRACT

A flash memory preprocessing system comprises at least one flash memory device, a memory controller controlling program and read operations of the at least one flash memory device, and a flash preprocessor receiving program data from an external source, generating preprocessed data by converting the received program data, and outputting the preprocessed data to the memory controller. The memory controller controls the at least one flash memory device to perform a program operation on the at least one flash memory device according to the preprocessed data.

19 Claims, 6 Drawing Sheets

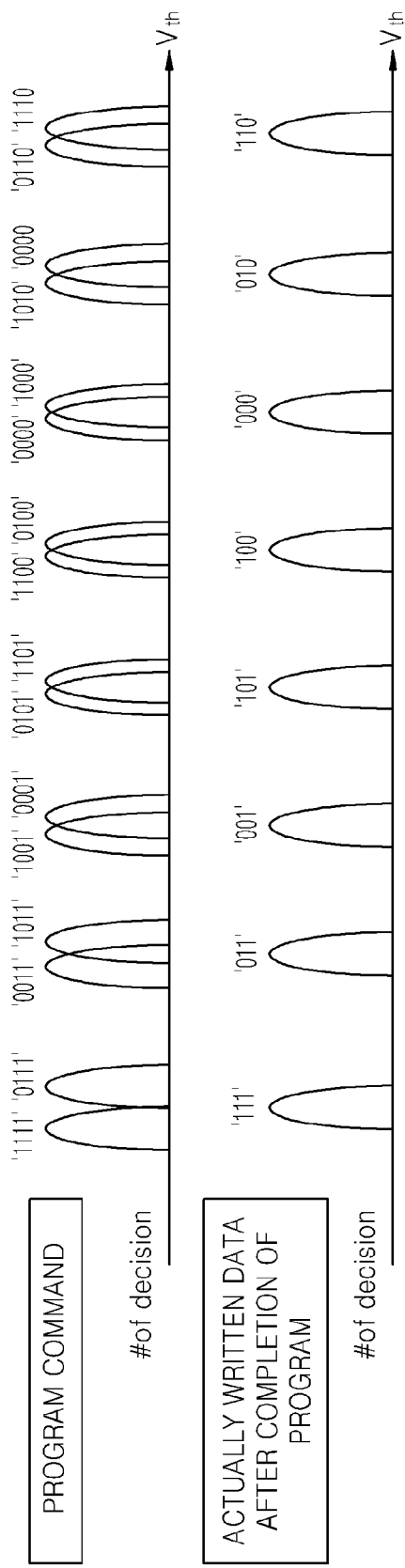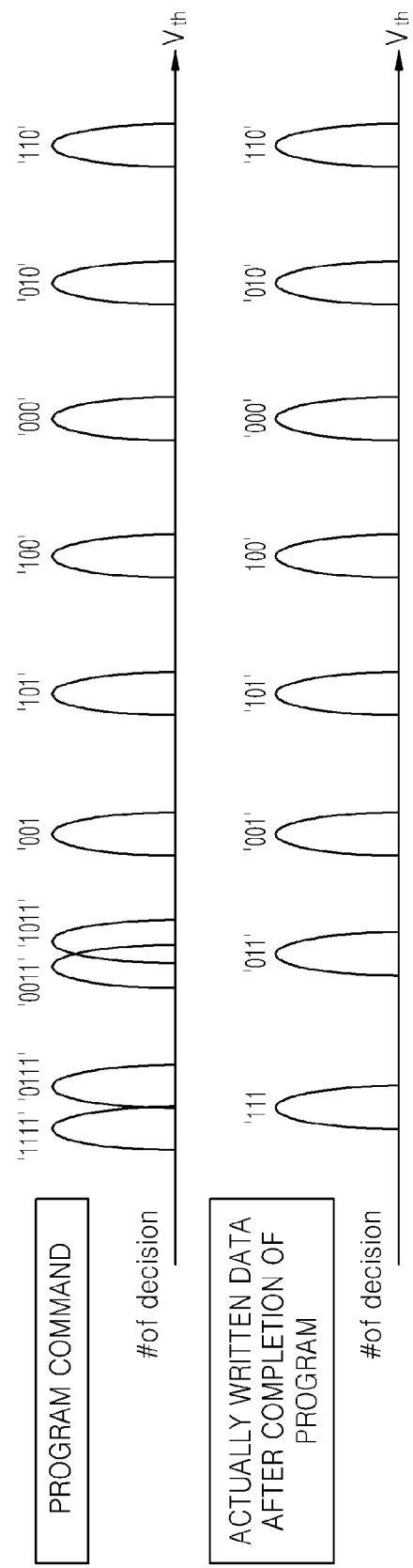

FLASH MEMORY PREPROCESSING SYSTEM AND METHOD

STATEMENT OF RELATED APPLICATION

This application claims priority under 35 U.S.C. §119 to Korean Patent Application No. 10-2009-0056539 filed on Jun. 24, 2009, the disclosure of which is hereby incorporated by reference in its entirety.

BACKGROUND

The inventive concept relates generally to systems and methods for storing electronic data. More particularly, the inventive concept relates to systems and methods for preprocessing data to be stored in a flash memory and then transmitting the preprocessed data to the flash memory.

Flash memory is a common form of nonvolatile data storage used in many modern electronic devices. Flash memories can be found, for instance, in portable devices such as cellular phones, personal data assistants (PDAs), digital cameras, portable game consoles, and MP3 players. Flash memory device can likewise be found in a variety of other applications such as high definition televisions (HDTVs), digital video discs (DVDs), routers, or global positioning system (GPSs).

The demand for flash memory continues to increase over time, especially in light of the increasing number of electronic devices used in everyday life. Moreover, there is an increasing demand for flash memories in applications other than mass data storage, including, for instance, code storage.

To address this increasing demand, researchers have devoted significant resources to developing flash memory devices with higher integration density, greater speed, and greater storage capacity. Achieving these aims, however, typically requires not only a reduction in the size and spacing of flash memory elements, but also various adjustments to account for electrical effects that arise or are magnified when the memory elements are placed in greater proximity. Moreover, it may also require various measures to address potential defects and degradation that may arise with greater frequency in the devices due to their decreasing size.

SUMMARY

Embodiments of the inventive concept provide a system and method of preprocessing a flash memory in which data to be stored in a flash memory is converted in advance by a flash preprocessor and then transmitted to a flash memory device.

According to one embodiment of the inventive concept, a flash memory preprocessing system comprises a flash memory device comprising a plurality of memory cells, a memory controller that controls programming and reading of the flash memory device; and a flash preprocessor that receives program data from an external source, generates preprocessed data by converting the received program data, and outputs the preprocessed data to the memory controller. The memory controller controls the flash memory device to perform a program operation of the flash memory device according to the preprocessed data.

In certain embodiments, the flash preprocessor comprises hardware or software located in a host.

In certain embodiments, the flash memory preprocessing system further comprises a preprocessing table storing information for implementing a data conversion method according to information regarding the flash memory device. The flash preprocessor generates the preprocessed data by converting the received program data according to the information for implementing the data conversion method and the information regarding the flash memory device.

In certain embodiments, the flash preprocessor adjusts voltage distribution of the preprocessed data corresponding to a first flash memory cell in response to data stored in a second flash memory cell adjacent to the first flash memory cell.

In certain embodiments, the memory cells in the flash memory each have a plurality of program states, and the flash preprocessor converts the program data into the preprocessed data by designating some of the plurality of program states as problematic patterns, reordering the program data to prevent neighboring flash memory cells from being programmed with the problematic patterns, and outputting the reordered program data as the preprocessed data.

In certain embodiments, the information regarding the flash memory device comprises information regarding bad blocks and wear leveling of the flash memory device, and the flash preprocessor corrects the preprocessed data based on the information about bad blocks and wear leveling of the at least one flash memory device and outputs the corrected preprocessed data.

In certain embodiments, the flash memory preprocessing system further comprises a reuse data storing unit storing the preprocessed data generated by the flash preprocessor, detecting whether incoming program data has been previously programmed in the flash memory device, and issuing the stored preprocessed data upon detecting that the incoming program data has been previously programmed in the flash memory device.

In certain embodiments, the flash memory preprocessing system further comprises a user interface for inputting a trust rate of program data from a user, and the flash preprocessor determines a conversion time and trust rate of the preprocessed data according to the trust rate input by the user.

In certain embodiments, the flash preprocessor determines a conversion time and a trust rate of the preprocessed data according to an expected preservation period of the received program data. In certain embodiments, the flash memory device comprises a multi-level cell flash memory device. In certain embodiments, the flash preprocessor performs preprocessing operations for a plurality of flash memory devices.

According to another embodiment of the inventive concept, a method of preprocessing a flash memory comprises receiving program data from an external source, generating preprocessing data by converting the received program data according to a data conversion method indicated by a stored preprocessing table and flash memory information, and performing a program operation on at least one flash memory device in accordance with the preprocessed data.

BRIEF DESCRIPTION OF THE DRAWINGS

Embodiments of the inventive concept will be more clearly understood from the following detailed description taken in conjunction with the accompanying drawings. In the drawings, like reference numerals denote like features.

FIG. 5 is another threshold voltage diagram illustrating different program states of the memory cells in the flash memory device of FIGS. 1 and 2;

FIG. 6 is yet another threshold voltage diagram illustrating different program states of the memory cells in the flash memory device of FIGS. 1 and 2;

DETAILED DESCRIPTION OF THE EMBODIMENTS

Various embodiments will be described more fully hereinafter with reference to the accompanying drawings. The inventive concept may, however, be embodied in many different forms and should not be construed as being limited to only the illustrated embodiments. Rather, these embodiments are presented as teaching examples.

Figure 1:
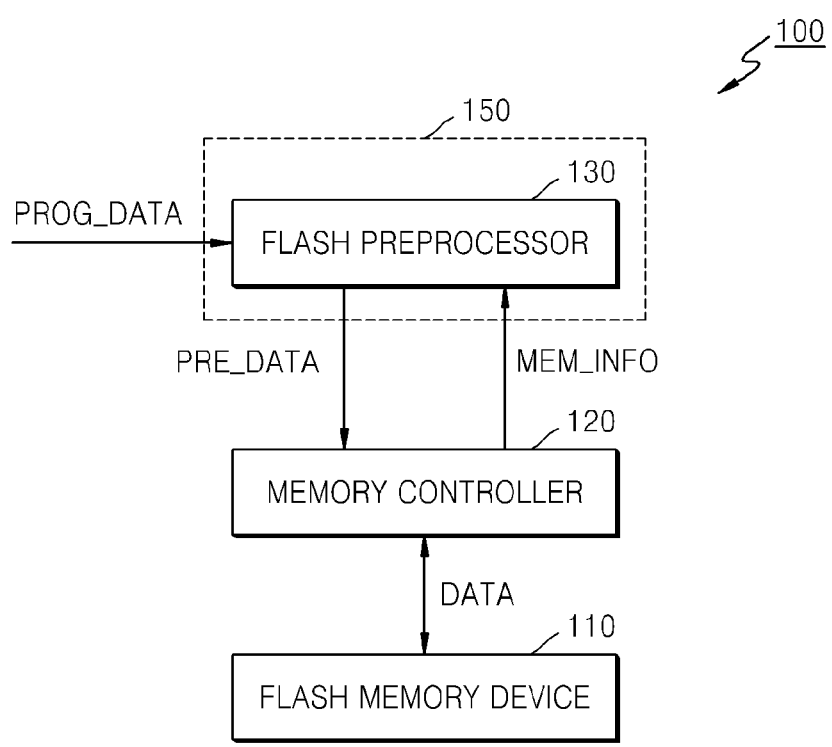
FIG. 1 is a block diagram of a flash memory preprocessing system according to an embodiment of the inventive concept.

FIG. 1 is a block diagram of a flash memory preprocessing system 100 according to an embodiment of the inventive concept. Referring to FIG. 1, flash memory preprocessing system 100 comprises at least one flash memory device 110, a memory controller 120, and a flash preprocessor 130.

Flash memory device 110 can be any type of flash memory device capable of writing and reading data. Memory controller 120 controls program and read operations of flash memory device 110. Memory controller 120 receives preprocessed data PRE_DATA from flash preprocessor 130 and performs a program operation on flash memory device 110 in based on the preprocessed data PRE_DATA.

Flash preprocessor 130 receives external program data PROG_DATA and converts the received program data PROG_DATA into preprocessed data PRE_DATA. Flash preprocessor 130 then outputs preprocessed data PRE_DATA to memory controller 120. In other words, in program operations of flash memory device 110, flash preprocessor 130 receives and preprocesses data to be programmed in flash memory 110 such that the data can be stored more reliably in flash memory 110.

Flash preprocessor 130 is typically implemented by hardware or software in host 150. Host 150 reads or programs data in flash memory device 110 and may be, for example, a personal computer.

Figure 2:
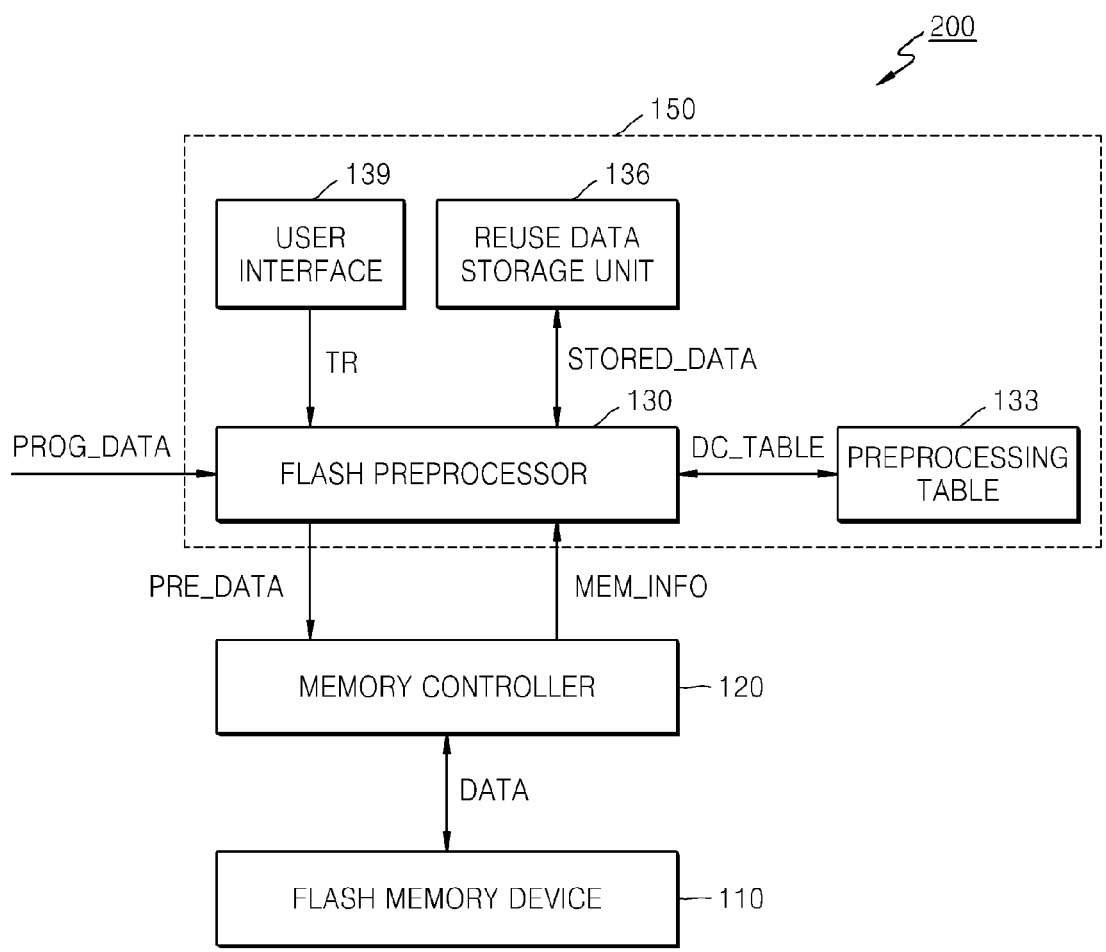
FIG. 2 is a block diagram of a flash memory preprocessing system according to another embodiment of the inventive concept.

FIG. 2 is a block diagram of a flash memory preprocessing system 200 according to another embodiment of the inventive concept. Referring to FIG. 2, flash memory preprocessing system 200 comprises flash memory device 110, memory controller 120, and host 150. Host 150 reads and programs data in flash memory device 110 and may be, for example, a personal computer.

In this embodiment, host 150 comprises flash preprocessor 130, a preprocessing table 133, a reuse data storage unit 136, and a user interface 139. Flash preprocessor 130 is typically implemented by hardware and/or software in host 150. Preprocessing table 133, reuse data storage unit 136, and user interface 139 may be included inside or outside of host 150.

Flash memory preprocessing system 200 further comprises preprocessing table 133 storing a data conversion method table DC_TABLE according to information of a flash memory. Flash preprocessor 130 receives flash memory information MEM_INFO from memory controller 120 and data conversion method table DC_TABLE from preprocessing table 133. Flash preprocessor 130 determines a conversion method to perform on program data PROG_DATA based on flash memory information MEM_INFO and data conversion method table DC_TABLE. The conversion method performed on program data PROG_DATA is described below with reference to FIGS. 4 through 7.

Where flash memory preprocessing system 200 does not comprise preprocessing table 133, data conversion method table DC_TABLE according to information of a flash memory may be stored in flash memory device 110 or in another storage device comprising a temporary memory (not shown) of host 150.

Additionally, data conversion method table DC_TABLE may be applied to each product of a flash memory. Data conversion method table DC_TABLE may also be updated based on use.

Reuse data storage unit 136 stores a part or all of preprocessed data PRE_DATA generated by flash preprocessor 130. When programming the same program data in flash memory device 110, flash memory preprocessing system 200 may use the data stored in reuse data storage unit 136. In other words, in some embodiments, flash memory preprocessing system 200 accesses and reuses preprocessed data PRE_DATA stored reuse data storage unit 136.

User interface 139 receives a trust rate TR of the program data PROG_DATA from a user and outputs trust rate TR to flash preprocessor 130. In general, trust rate TR relates to reliability of stored data and may be varied based on factors such as the frequency with which the data is programmed and erased. Flash preprocessor 130 determines the conversion time and trust rate TR of preprocessed data PRE_DATA according to trust rate TR input from the user. As trust rate TR input by the user increases, the conversion time of preprocessed data PRE_DATA increases.

In some embodiments, flash memory preprocessing system 200 omits user interface 139. In such embodiments, flash preprocessor 130 determines the conversion time and trust rate TR of preprocessed data PRE_DATA according to an expected preservation period of the input program data PROG_DATA. For example, trust rate TR may be automatically selected according to whether data is to be frequently erased and programmed or will not be corrected once written.

In other words, when receiving a request for programming having a certain trust rate TR through user interface 139 or from inside or outside the system, flash preprocessor 130 preprocesses program data PROG_DATA, and generates and outputs preprocessed data PRE_DATA suitable for a dispersion or trust characteristic.

Referring still to FIG. 2, flash memory information MEM_INFO received from memory controller 120 comprises information about bad blocks and wear leveling of flash memory device 110. Flash preprocessor 130 corrects and outputs preprocessed data PRE_DATA based on the information about bad blocks and wear leveling of flash memory device 110. That is, in the process of generating preprocessed data PRE_DATA by converting program data PROG_DATA, preprocessed data PRE_DATA is corrected according to the current state of flash memory device 110.

Figure 3:
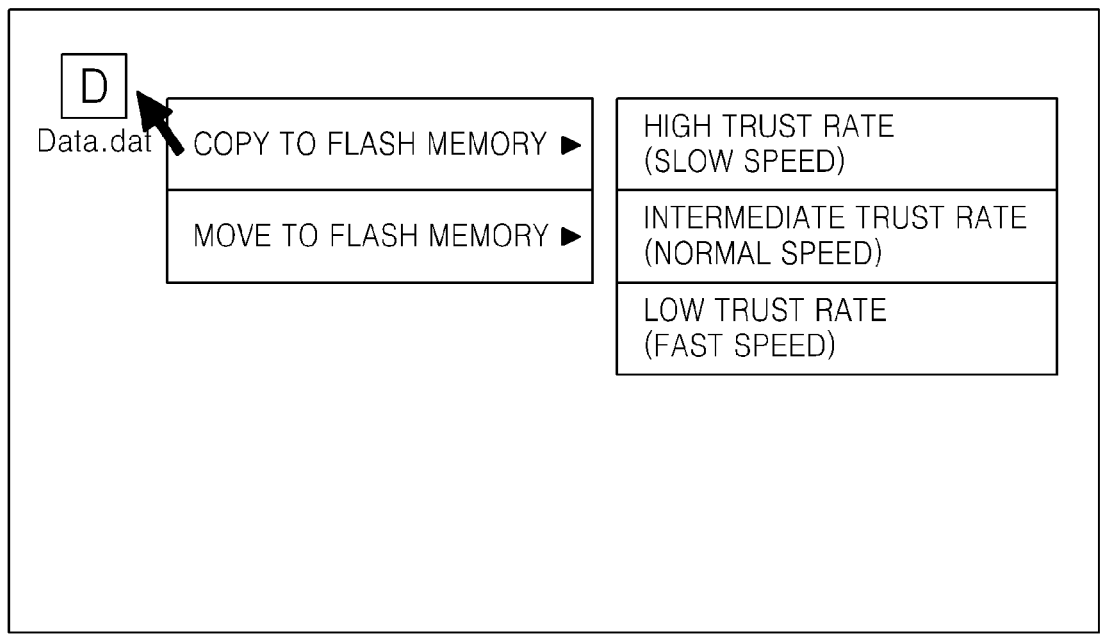
FIG. 3 is an illustration of a screen displaying a user interface according to an embodiment of the inventive concept.

FIG. 3 shows a screen displaying a user interface according to an embodiment of the inventive concept. Referring to FIG. 3, the screen is displayed to a user via a display unit (not shown) so that the user may select trust rate TR of data to be stored in a flash memory. As described above with reference to FIG. 2, where trust rate TR is input by the user, user interface 139 outputs trust rate TR input by the user to flash preprocessor 130. Flash preprocessor 130 determines the conversion time and trust rate TR of preprocessed data PRE_DATA, which may be determined according to the trust rate TR input by the user.

Figure 4:
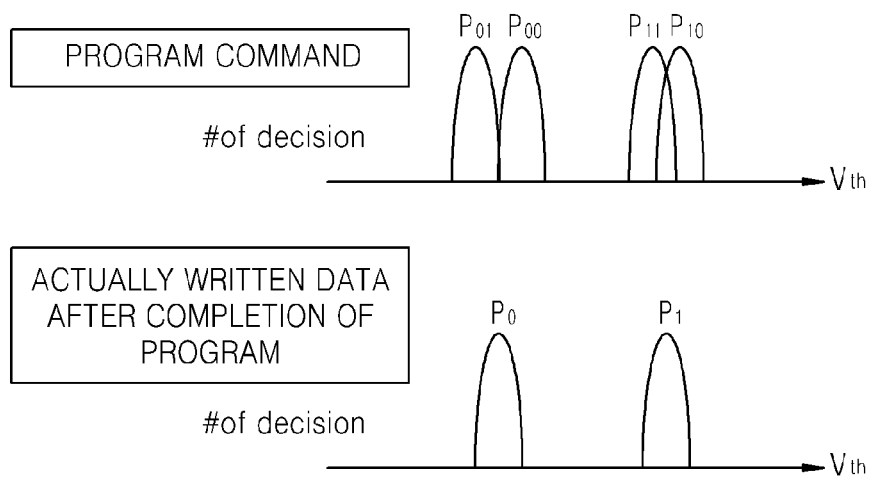
FIG. 4 is a threshold voltage diagram illustrating different program states of memory cells in the flash memory device of FIGS. 1 and 2.

FIG. 4 is a threshold voltage diagram illustrating different program states of memory cells in the flash memory device of FIGS. 1 and 2. Referring to FIGS. 2 and 4, flash preprocessor 130 adjusts the dispersion of preprocessed data PRE_DATA stored in a first flash memory cell in response to the data stored in a second flash memory cell (not shown) adjacent to the first flash memory cell (not shown). The first and second memory cells are memory cells provided in flash memory device 110, and in this example, the first flash memory cell is a victim cell and the second memory cell is an aggressor cell.

To minimize electrical coupling or other interference on the first flash memory cell in which the externally input program data PROG_DATA is programmed, flash preprocessor 130 adjusts a verify level of the first flash memory cell based on the data stored in the second flash memory cell adjacent to the first flash memory cell.

Referring to FIG. 4, where the data of the second flash memory cell is in first program state $P_0$ and the first flash memory cell is to be programmed to first program state $P_0$, the first flash memory cell is programmed to have a corrected first program state $P_{00}$ because the second flash memory cell affects the first flash memory cell. In other words, the first flash memory cell is programmed to first program state P00 to account for electrical effects caused by the program state of the second flash memory cell. Also, where the data of the second flash memory cell is in second program state $P_1$ and the first flash memory cell is to be programmed to first program state $P_0$, the first flash memory cell may be programmed to a corrected first program state $P_{01}$ due to electrical effects caused by the second flash memory cell.

Meanwhile, where the first flash memory cell is to be programmed to second program state P1, the first flash memory cell is programmed to corrected second program state $P_{10}$ or $P_{11}$ based on data stored in the second flash memory cell. As described above, the first flash memory cell is programmed with a corrected verify voltage based on the data stored in the second flash memory cell in order to account for electrical coupling or other electrical disturbances caused by programming of the second flash memory cell. The data actually written to the first flash memory cell after the completion of programming may change to first program state $P_0$ or second program state $P_1$.

FIG. 4 illustrates an example in which flash memory device 110 of FIGS. 1 and 2 is a single-level cell (SLC) flash memory, i.e., a device in which each memory cell stores one bit of data. As an alternative to the example of FIG. 4, flash memory device 110 illustrated in FIGS. 1 and 2 could be a multi-level cell (MLC) flash memory, i.e., a device in which each memory cell stores multiple bits of data.

FIG. 5 is another threshold voltage diagram illustrating different program states of the memory cells in the flash memory device of FIGS. 1 and 2. FIG. 5 illustrates a case in which flash memory device 110 is an MLC flash memory and each flash memory cell stores three bit data. While FIG. 5 illustrates an example where memory cells store three bit data, this and other embodiments could be modified to use memory cells storing additional levels of data, i.e., more bits per cell.

Referring to FIG. 5, the most significant bit of four bits used in a program command denotes state information of an adjacent memory cell. As an example, where data corresponding to "111" is to be programmed in the first flash memory cell, and the second flash memory cell adjacent to the first flash memory cell is in first program state $P_0$, the most significant bit is "1". On the other hand, where the second flash memory cell is in second program state $P_1$, the most significant bit is "0". Thus, where a command is received to program the first flash memory cell to "111", the first flash memory cell is programmed to a distribution labeled "1111" or "0111" based on the data stored in the second flash memory cell. These distributions are achieved by performing the programming operation with a corrected verify voltage. The first flash memory cell is programmed with a corrected verify voltage based on the data stored in the second flash memory cell to account for electrical coupling or other interference produced by the program state of the second flash memory cell. Consequently, the data actually written to the first flash memory cell after the completion of programming may have change to state "111", which is described above with reference to FIG. 4.

FIG. 6 is yet another threshold voltage diagram illustrating different program states of the memory cells in the flash memory device of FIGS. 1 and 2. The program states of the flash memory cells of FIG. 6 are similar to those of FIG. 5. However, when there is a program command to the first flash memory cell, there is a difference in that the data state of the second flash memory cell adjacent to the first flash memory cell is considered only when the first flash memory cell is programmed to data corresponding to "111" or "011". In other words, in this embodiment, flash preprocessor 130 programs the first flash memory cell while taking into account the data of the neighboring second flash memory cell only when the first flash memory cell is programmed to certain states.

Figure 7:
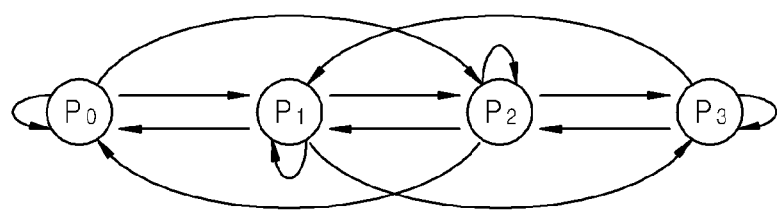
FIG. 7 is a state diagram illustrating state changes of neighboring flash memory cells according to an embodiment of the inventive concept.

FIG. 7 is a state diagram illustrating state changes between neighboring flash memory cells according to an embodiment of the inventive concept. In particular, FIG. 7 illustrates an example where a flash memory cell is a 2-bit MLC memory and each flash memory cell is programmed to one of first through fourth program states P0, P1, P2, and P3. In the state diagram of FIG. 7, the arrows indicate different states that are mutually compatible. In particular, an arrow from one state to another state indicates that if the first memory cell is in the one state, and the second memory cell is in the other state, the first memory cell can be programmed to the one state with relatively low interference from the second memory cell. On the other hand, where there is no arrow between one state and another state, the first cell may experience electrical coupling or other interference when programmed to the one state while the other memory cell is in the other state.

Flash preprocessor 130 sets some of the first through fourth program states P0, P1, P2, and P3 as problematic patterns based on compatibility relationships such as those illustrated by the state diagram of FIG. 7. For instance, in the example of FIG. 7, first and fourth program states P0 and P3 are set as problematic patterns because the first memory cell may experience coupling or other disturbances if programmed to state P0 while the second memory cell is in state P3. Accordingly, flash preprocessor 130 prevents two neighboring flash memory cells from being programmed with the problematic patterns to avoid programming errors or defects due to electrical coupling or other forms of interference.

To ensure that a state change does not occur between first and fourth program states P0 and P3 in FIG. 7, flash preprocessor 130 converts program data PROG_DATA to preprocessed data PRE_DATA. Such conversion may involve, for instance, reordering programmed data such that programmed memory cells do not include problematic patterns. As an example, where the first flash memory cell is programmed to first program state P0 as data is programmed in flash memory device 110, to prevent the second flash memory cell adjacent to the first flash memory cell from being programmed to fourth program state P3, flash preprocessor 130 converts program data PROG_DATA to preprocessed data PRE_DATA and outputs preprocessed data PRE_DATA. Where the first flash memory cell is programmed to fourth program state P3, to prevent the second flash memory cell adjacent to the first flash memory cell from being programmed to first program state P0, flash preprocessor 130 converts program data PROG_DATA to preprocessed data PRE_DATA and outputs preprocessed data PRE_DATA.

Although the method of converting program data PROG_DATA to preprocessed data PRE_DATA using flash preprocessor 130 is described above with reference to FIGS. 4 and 7, flash preprocessor 130 provided in the flash memory preprocessing system according to this embodiment generates preprocessed data PRE_DATA in a variety of methods.

The following illustrates one example of a method of generating preprocessed data PRE_DATA by converting program data PROG_DATA using flash preprocessor 130. In the method, a read voltage of a flash memory cell is set by taking into account a number and location of aggressor cells and value of data to be programmed. Taking these factors into account, flash preprocessor 130 reorders the data to be programmed to accomplish sequential reading with reduced errors due to electrical coupling or other interference. In other words, where data is programmed in a flash memory cell, the order of the program data may be changed to be suitable for reading (e.g., without causing errors due to shifted threshold voltages). The data is then sequentially programmed according to the changed order so that data may be read from the programmed data. This method may be applied in units of blocks or two or more wordlines of a flash memory cell. In addition, flash preprocessor 130 may generate preprocessed data PRE_DATA using a two-dimensional run length limited (RLL) code of a bitline or wordline, or data program sequence used for increasing storage capacity.

Figure 8:
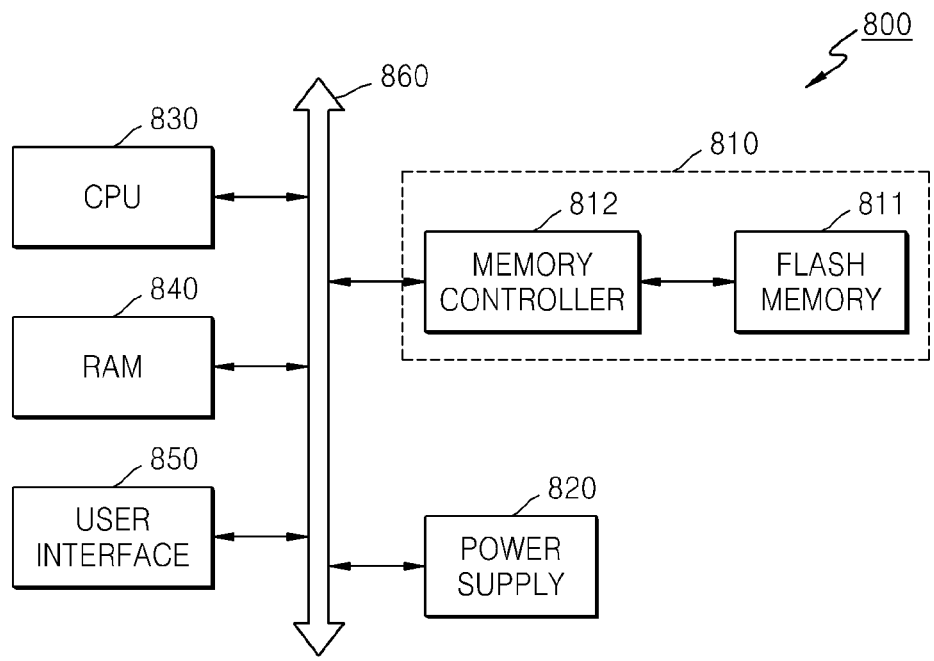
FIG. 8 is a block diagram of a computing system comprising a flash memory preprocessing system according to an embodiment of the inventive concept.

FIG. 8 is a block diagram of a computing system 800 comprising a flash memory preprocessing system according to an embodiment of the inventive concept. Referring to FIG. 8, computing system 800 comprises a microprocessor 830 electrically connected to a bus 860, a user interface 850, and a memory system 810. Memory system 810 comprises a memory controller 812 and a flash memory device 811. Memory controller 812 controls flash memory device 811 to store N-bit data, where N is an integer greater than or equal to 1. The data to be stored in flash memory device 811 is preprocessed by microprocessor 830. Computing system 800 according to the embodiment further comprises a RAM 840 and a power supply unit 820. In this embodiment, microprocessor 830 comprises flash preprocessor 130.

When computing system 800 is a mobile device, a battery for supplying an operating voltage of a computing system and a modem such as a baseband chipset may be additionally provided. Also, computing system 800 may further comprise an application chipset, a CMOS image sensor (CIS), or a mobile DRAM. Memory controller 812 and flash memory device 811 may constitute, for example, a solid state drive/disk (SSD) using a non-volatile memory for storing data.

Figure 9:
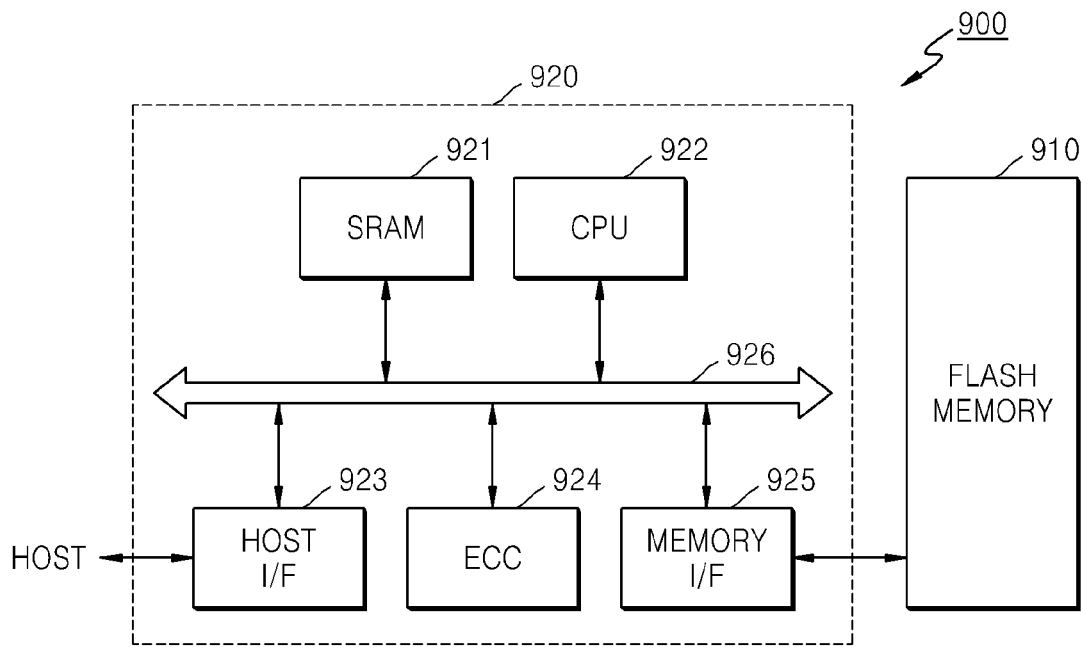
FIG. 9 is a block diagram of a memory card comprising a memory controller and a flash memory device according to an embodiment of the inventive concept.

FIG. 9 is a block diagram of a memory card 900 comprising a memory controller 920 and a flash memory device 910 according to an embodiment of the inventive concept. In this embodiment, memory controller 920 is configured to communicate with the external entities, such as a host, via one of a variety of interface protocols such as universal serial bus (USB), multimedia card (MMC), peripheral component interconnect-express (PCI-E), serial advanced technology architecture (SATA), parallel advanced technology attachment (PATA), small computer system interface (SCSI), enhanced small disk interface (ESDI), and integrated drive electronics (IDE).

Memory controller 920 comprises a variety of structures, such as a CPU 922, a static random access memory (SRAM) 921, a host interface (I/F) 923, an error correction code (ECC) unit 924, a memory interface 925, and a bus 926. Collectively, these elements function to control operations of flash memory 910.

The above-described flash memory device according to the inventive concept may be mounted using a variety of packages. For example, the flash memory device according to the inventive concept may be mounted in a package on package (PoP) configuration, ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small-outline integrated circuit (SOIC), a shrink small outline package (SSOP), a thin small outline (TSOP), a system on package (SIP), a multi-chip package (MCP), a wafer-level fabricated package (WFP), a wafer-level processed stack package (WSP).

Figure 10:
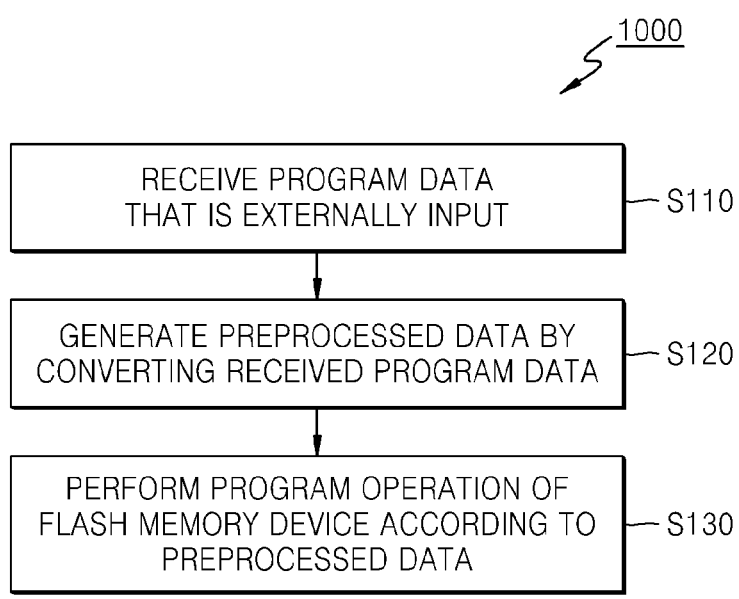
FIG. 10 is a flowchart illustrating a method of preprocessing a flash memory according to an embodiment of the inventive concept.

FIG. 10 is a flowchart illustrating a method 1000 of preprocessing a flash memory according to an embodiment of the inventive concept. Referring to FIG. 10, method 1000 comprises receiving externally input program data (S110), generating preprocessed data by converting the input program data using a data conversion method stored in a preprocessing table and flash memory information (S120), and performing a program operation of at least one flash memory device according to the preprocessed data (S130). The example steps of this method can be better understood through the above descriptions of FIGS. 1 through 9. Accordingly, further description of these steps will be omitted to avoid redundancy.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:
1. A flash memory preprocessing system, comprising:
a flash memory device comprising a plurality of memory cells;
a memory controller that controls programming and reading of the flash memory device;
a flash preprocessor that receives program data from an external source, generates preprocessed data by converting the received program data in accordance with data to be stored in neighboring flash memory cells, and outputs the preprocessed data to the memory controller; and a preprocessing table storing information for implementing a data conversion method according to flash memory information, wherein the memory controller controls the flash memory device to perform a program operation of the flash memory device according to the preprocessed data, and wherein the flash preprocessor generates the preprocessed data by converting the received program data in accordance with the flash memory information and the data conversion method.

2. The flash memory preprocessing system of claim 1, wherein the flash preprocessor comprises hardware or software located in a host.

3. The flash memory preprocessing system of claim 1, wherein generating the preprocessed data by the flash preprocessor adjusts a voltage distribution storing at least one bit of the preprocessed data in a first flash memory cell in response to another at least one bit of the preprocessed data stored in a second flash memory cell adjacent to the first flash memory cell.

4. The flash memory preprocessing system of claim 1, wherein each one of the plurality of memory cells is configured to store multi-bit data in accordance with a plurality of program states, and generating the preprocessed data by the flash preprocessor comprises:

designating at least one programming of the preprocessed data from one program state to another program state among the plurality of program states as a problematic pattern; and reordering the program data to prevent neighboring memory cells among the plurality of memory cells from being programmed according to the at least one problematic pattern.

5. The flash memory preprocessing system of claim 1, wherein the flash memory information is information regarding bad blocks and wear leveling of the flash memory device, and the flash preprocessor corrects the preprocessed data based on the information regarding bad blocks and wear leveling of the flash memory device and outputs the corrected preprocessed data.

6. The flash memory preprocessing system of claim 1, further comprising:

a reuse data storing unit that stores at least part of the preprocessed data generated by the flash preprocessor, detects whether the program data has been previously programmed in the flash memory device, and provides the stored preprocessed data upon detecting that the incoming program data has been previously programmed in the flash memory device.

7. The flash memory preprocessing system of claim 1, wherein the flash memory device comprises a multi-level cell flash memory device.

8. The flash memory preprocessing system of claim 1, wherein the flash preprocessor performs preprocessing operations for a plurality of flash memory devices.

9. A flash memory preprocessing system comprising:

a flash memory device comprising a plurality of memory cells;

a memory controller that controls programming and reading of the flash memory device;

a flash preprocessor that receives program data from an external source, generates preprocessed data by converting the received program data, and outputs the preprocessed data to the memory controller; and a user interface that facilitates input by a user of a trust rate for the program data, wherein the flash preprocessor thereafter determines a conversion time and trust rate for the preprocessed data according to the input trust rate, and the memory controller controls the flash memory device to perform a program operation of the flash memory device according to the preprocessed data.

10. The flash memory preprocessing system of claim 9, wherein the user interface is a screen responsive to user inputs.

11. The flash memory preprocessing system of claim 9, wherein each one of the plurality of memory cells is a multi-level flash memory cell.

12. A flash memory preprocessing system comprising:

a flash memory device comprising a plurality of memory cells;

a memory controller that controls programming and reading of the flash memory device; and a flash preprocessor that receives program data from an external source, generates preprocessed data by converting the received program data, and outputs the preprocessed data to the memory controller, wherein the flash preprocessor determines a conversion time and a trust rate of the preprocessed data according to an expected preservation period of the received program data, and the memory controller controls the flash memory device to perform a program operation of the flash memory device according to the preprocessed data.

13. The flash memory preprocessing system of claim 12, wherein each one of the plurality of memory cells is a multi-level flash memory cell.

14. A method of preprocessing a flash memory, comprising:

receiving program data from an external source;

generating preprocessed data by converting the received program data in accordance with data to be stored in neighboring flash memory cells and a data conversion method selected from a preprocessing table in response to flash memory information; and performing a program operation on at least one flash memory device in accordance with the preprocessed data.

15. The method of claim 14, wherein each memory cell of the flash memory is configured to store multi-bit data in accordance with a plurality of program states, and generating the preprocessed data by the flash preprocessor comprises:

designating at least one programming of the preprocessed data from one program state to another program state among the plurality of program states as a problematic pattern; and reordering the program data to prevent neighboring memory cells among the plurality of memory cells from being programmed with the preprocessed data according to the at least one problematic pattern.

16. The method of claim 14, wherein the at least one flash memory device is a multi-level cell flash memory device.

17. A flash memory host communicating with a flash memory device, comprising:

a flash preprocessor configured to receive program data from an external source and generate preprocessed data;

a preprocessing table that stores information implementing a data conversion method according to flash memory information; and a reuse data storing unit that stores at least part of the preprocessed data, detects whether the program data has been previously programmed to the flash memory device, and upon detecting that the program data has been previously programmed to the flash memory device, provides the stored preprocessed data, wherein the flash memory information comprises information regarding bad blocks and wear leveling of memory cells of the flash memory device, and the flash preprocessor is further configured to generate the preprocessed data by converting the program data to be stored in a target memory cell in accordance with program data to be stored at least one neighboring memory cell, and correct the preprocessed data based on the flash memory information.

18. The flash memory host of claim 17, wherein the flash preprocessor is further configured during the generating of the preprocessed data to adjust a voltage distribution used to store one bit of preprocessed data in the target memory cell in response to another bit of the preprocessed data to be stored in a neighboring memory cell.

19. The flash memory host of claim 17, wherein each one of the plurality of memory cells is configured to store multi-bit data in accordance with a plurality of program states, and the flash preprocessor is further configured during the generating of the preprocessed data to;

designate programming of preprocessed data from one program state to another program state as a problematic pattern; and reorder the program data to prevent neighboring memory cells from being programmed according to the problematic pattern.

\* \* \* \* \*